United States Patent [19]

Ono et al.

[11] Patent Number: 5,126,773
[45] Date of Patent: Jun. 30, 1992

[54] PHOTOGRAPHIC CAMERA CAPABLE OF INCORPORATING ADDITIONAL IMAGE SUCH AS LETTER AND PICTURE

[75] Inventors: Taizo Ono; Toshitaka Yagi, both of Osaka, Japan

[73] Assignee: Matsushita Electric Industrial Co., Ltd., Osaka, Japan

[21] Appl. No.: 724,886

[22] Filed: Jul. 2, 1991

[30] Foreign Application Priority Data

Jul. 11, 1990 [JP] Japan .................................. 2-183119

[51] Int. Cl.⁵ .............................................. G03B 17/24
[52] U.S. Cl. .................................................... 354/106
[58] Field of Search ....................... 354/105, 106, 109; 378/162

[56] References Cited

U.S. PATENT DOCUMENTS 1,362,787 12/1920 Gongaware ........................ 354/109

*Primary Examiner*—Michael L. Gellner
*Attorney, Agent, or Firm*—Wenderoth, Lind & Ponack

[57] ABSTRACT

A photographic camera capable of recording additional image comprising: an optical assembly including a lens and a shutter to form an image of a photographed subject on an image recording medium; and an additional image sheet having an additional image comprising a light transmitting part and an opaque part, which is placed in an image forming optical passage between the optical assembly and the image recording medium being closely to or slightly in contact with the image recording medium. The camera is simple, economical and reliable. Any additional image can be easily recorded in desired color and size.

6 Claims, 1 Drawing Sheet

PHOTOGRAPHIC CAMERA CAPABLE OF INCORPORATING ADDITIONAL IMAGE SUCH AS LETTER AND PICTURE

BACKGROUND OF THE INVENTION

The present invention relates to a photographic camera capable of recording on an image recording medium loaded therein at least one additional image such as a letter, a numeral, an illustration or the like as well as a photographed subject.

There has been widely known and practically used a photographic camera which can record on an image recording medium an image such as a letter and a numeral simultaneously with a photographed subject.

This type of conventional camera is disclosed in, for example, Japanese Unexamined Patent Publication Nos. 60-3615 and 62-291626, wherein additional information such as date and time is recorded near the border of the picture recording film plane. In these conventional camera, in order to incorporate the additional information there have been employed: a method wherein an additional information is irradiated by use of a luminous element such as a flash discharge tube, a light emitting diode and a liquid crystal display and is recorded on a film from the front surface on the side of the lens barrel or the camera body; and another method wherein a luminous element is provided at a rear cover and an irradiated additional information is recorded on a film from the back surface. Further, U.S. Pat. No. 4,090,189 discloses a photographic camera, wherein a data element such as a letter and a numeral stored in the data block is taken through a lens on lighting of a lamp and recorded on a film together with an image of photographed subject.

As known well, a camera in recent date is equipped with, in addition to a lens assembly and a shutter assembly, various function mechanisms for example an autofocus mechanism, an auto-film-feed mechanism, a stroboscope mechanism and the like. These various functions make the operation of a camera easy and accordingly make a camera extreamly useful for users.

Further, a whole size of a camera in recent date has been made smaller to be easily handcarried.

Therefore, in order to allow a camera to have various functions and to be small in size, it becomes an important problem to incorporate various devices, mechanical parts, electrical parts or the like into a camera.

However, the aforementioned conventional cameras described in the prior arts requires complex and sophisticated devices. For example, the camera described in the above U.S. Pat. No. 4,099,189 has a data block device comprising a lamp, a data element, a lens and the like for recording a letter, data or the like together with an image of photographed subject. Accordingly, the camera has a problem that the whole size must be large enough to accommodate the device, and the device is complex in structure and laborious to install, which leads to a large increase of production cost.

Although there are many cameras similar to but different from those described in the above prior art, each of them has a complex device for recording a letter, data or the like and consequently has a similar problem.

SUMMARY OF THE INVENTION

An object of the present invention is to solve the problem lying in these prior art cameras and to provide a novel camera which has a simple structure and does not cause an increase in the whole size, and which results in almost no increase in cost.

In order to attain the object, there is provided according to the present invention a photographic camera capable of recording additional image comprising: an optical assembly including a lens and a shutter to form an image of a photographed subject on an image recording medium; and an additional image sheet having an additional image comprising a light transmitting part and an opaque part, which is placed in an image forming optical passage between the optical assembly and the image recording medium being closely to or slightly in contact with the image recording medium. The thickness of the additional image sheet is preferably 50 $\mu$m to 1 mm in case of the sheet close to the recording medium and 50 $\mu$m to 200 $\mu$m in case of the sheet in contact with the recording medium. If desirable, a plurality of different additional image sheets are used in combination.

The photographic camera of the present invention has a simple, economical and reliable structure for recording an additional image. The additional image such as a corporate mark and a character can be easily prepared in desired color and size by means of the printing technology, the photographic technology or the like and two or more images can be easily combined by any desired arrangement of the additional image sheets.

BRIEF DESCRIPTION OF THE DRAWINGS

Embodiments of the invention will now be described by way of example only, in conjunction with the attached drawings included:

FIG. 1 is an explanatory view of a first embodiment of the present invention showing a main part of a photographic camera capable of recording an additional image such as a letter, an illustration or the like;

FIG. 2 is an explanatory view of a second embodiment of the present invention showing a main part of another photographic camera capable of recording an additional image such as a letter, an illustration or the like.

DETAILED DESCRIPTION OF THE INVENTION

Figure 1:
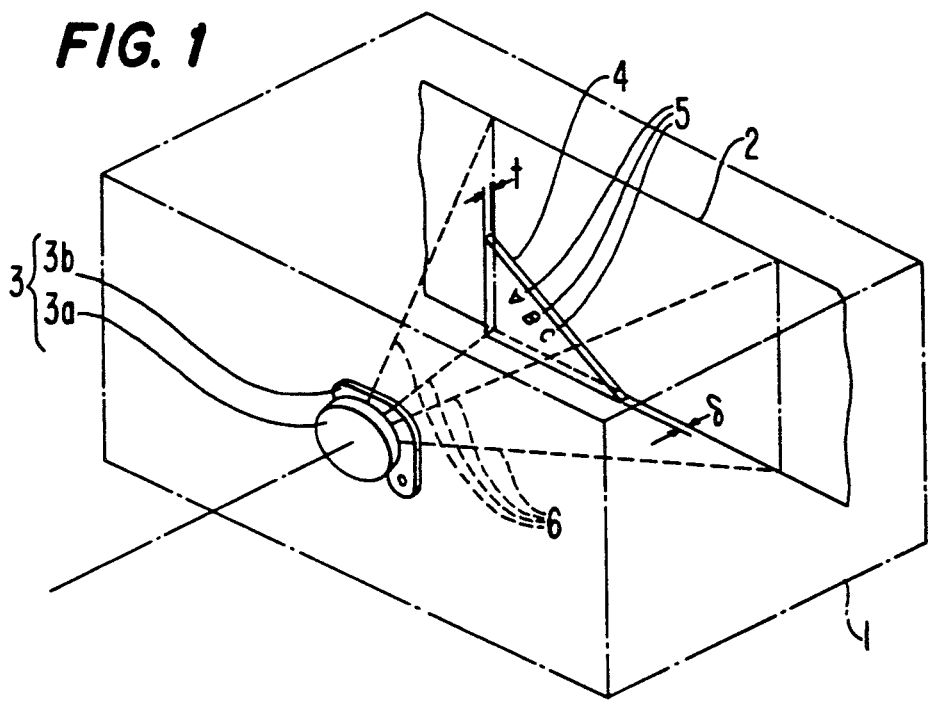

In FIG. 1, the numeral 1 is a casing of a camera, and the numeral 2 is an image recording medium such as a photographic (silver salt) film in a rolled form, an instant film in a sheet form and the like loaded in the casing 1.

In this embodiment shown in FIG. 1, there is used as an image recording medium 2 a photographic film containing patrone in a rolled shape.

The numeral 3 is an optical assembly, which has a well known structure comprising a lens 3a, a shutter 3b and the like, and forms an image of a photographed subject on the film 2.

The numeral 4 is an additional image sheet using a photolithographic film, a printing film or the like on which a clear image such as a letter, an illustration and the like is recorded. The additional image sheet 4 can be a colorless transparent sheet having an opaque image theron, a colored transparent sheet having an opaque image thereon or to the contrary a sheet having a transparent image part and an opaque other part.

The additional image sheet 4 is located in an image forming optical passage between the film 2 and the optical assembly 3 in such a manner that the additional image sheet 4 is closely to or slightly in contact with the image recording medium.

In the first embodiment, the additional image sheet 4 is disposed so that a surface of the sheet having an additional image 5 faces the optical assembly 3. By virtue of this arrangement the additional image 5 is protected from being damaged or peeled off by the sliding contact with the film 2.

In case of an arrangement wherein the additional image sheet 4 is close to and out of contact with the film 2, a distance δ between the additional image sheet 4 and the film 2 must be limited within a range. If the distance is more than 1 mm, it becomes very difficult for the image 5 such as a letter and an illustration on the additional image sheet 4 to be clearly recorded on the film 2. Thus the distance between the sheet 4 and the film 2 is required to be not more than 1 mm, and from another point of view to be not less than 0.1 mm to avoid contact between the additional image sheet 4 and the film 2.

With respect to the thickness t of the additional image sheet 4 in this arrangement wherein the sheet 4 is close to (and out of contact with) the film 2, the thickness is required to be about 50 μm to about 1 mm in order to prevent the image 5 of a letter and an illustration from beeing recorded obscurely on the film 2 due to loosening, deformation or the like of the sheet 4 and to simultaneously facilitate the placement work of the sheet 4.

In case of an alternative arrangement wherein the additional image sheet 4 is brought into slightly contact with the film 2, the thickness of the additional image sheet 4 is required to be about 50 μm to about 200 μm in order to prevent the image 5 from being damaged, to prevent the above-mentioned obscure recording from taking place, and also to facilitate the placement work of the sheet 5.

For example, a recording test was carried out to observe the recording quality of an image 5 on a film 2. The film 2 was a silver salt film of well known 35 mm size. As the additional image sheet 4, there was used a made-up film having a thickness t of 100 μm on which some letters had been formed. The distance δ between the additional image sheet 4 and the film 2 was about 100 μm. As a result, it was confirmed that in the arrangement wherein the additional image sheet 4 having a clear letter 5 recorded and formed on the surface was located in the image forming optical passage 6 from the optical assembly 3 to the film 2 surface, it was possible to record both the image of the photographed subject and the image 5 of the additional image sheet 4 simultaneously and clearly on the film 2 with only the light from outside through the optical assembly 3.

Figure 2:
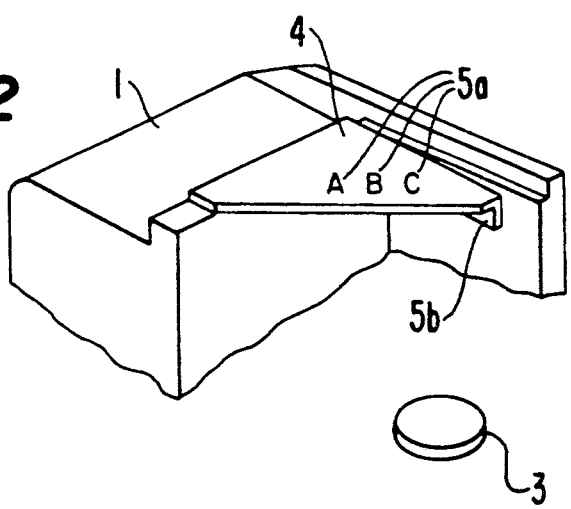

In the second embodiment shown in FIG. 2, an image 5a formed on an additional image sheet 4 has been printed by baking, and the additional image sheet 4 is attached to a casing 1 in such a manner that the surface having the image 5a formed thereon faces the film 2.

Since the image 5a and the film 2 are close to and facing each other in the second embodiment, it is possible to record more clearly the image 5a on the film.

Further, a folded part 5b is provided in the additional image sheet 4 at a peripheral portion. Accordingly, the rigidity of the sheet 4 is improved, and as a result, the plane of the sheet 4 is maintained and therefore the accuracy of the plane of the image 5a is improved so that it becomes possible to record more clearly the image 5a on the film 2.

Moreover, the thickness of the additional image sheet 4 can be thinner than the aforementioned t.

Figure 3:
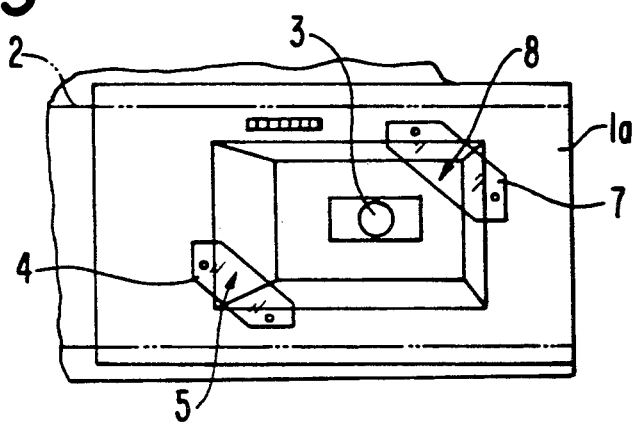
FIG. 3 is an explanatory view of a third embodiment of the present invention showing a main part of a photographic camera having a structure which employs a plurality of additional image sheets to facilitate an optional combination of additional images.

In the third embodiment shown in FIG. 3, two additional image sheets 4, 7 respectively having desired images 5, 8 are respectively attached closely to desired corners of the recording rectangular plane of the film 2. By engaging holes provide near the edge of the sheets 4, 7 with small protrusions formed on a casing 1a, the additional image sheets 4, 7 are attached to the casing 1a.

The number of the additional image sheets may be 3 or more. They may be arranged at separate locations or they may be arranged in such a manner that they overlap each other at least partially. By virtue of this arrangement wherein a plurality of additional image sheets having desired images are thus arranged in a desired manner, various additional images can be easily recorded on an image recording medium in accordance with a given purpose, for example, classification and identification.

The image recording medium 2 may comprise optical sensors such as CCD, MOS or the like arranged in a plane matrix form combined with memory means such as an IC memory device, a recording disk to store the signal from the sensors.

What is claimed is:

1. A photographic camera capable of recording additional image comprising:
   an optical assembly including a lens and a shutter to form an image of a photographed subject on an image recording medium loaded in a casing; and
   an additional image sheet of 50 μm to 1 mm thickness having an additional image in a plane comprising a light transmitting part and an opaque part, which is placed in an image forming optical passage from said optical assembly being close to said image recording medium;
   wherein a distance between said image recording medium and said additional image sheet is 0.1 mm to 1.0 mm.

2. A photographic camera according to claim 1, wherein said additional image sheet has said additional image on one surface and is disposed so that said one surface faces said optical assembly.

3. A photographic camera according to claim 1, wherein a plurality of additional image sheets are placed in said image forming optical passage.

4. A photographic camera capable of recording additional image comprising:
   an optical assembly including a lens and a shutter to form an image of a photographed subject on an image recording medium loaded in a casing; and
   an additional image sheet of 50 μm to 200 μm thickness having an additional image in a plane comprising a light transmitting part and an opaque part, which is placed in an image forming optical passage from said optical assembly being slightly in contact with said image recording medium.

5. A photographic camera according to claim 4, wherein said additional image sheet has said additional image on one surface and is disposed so that said one surface faces said optical assembly.

6. A photographic camera according to claim 4, wherein a plurality of additional image sheets are placed in said image forming optical passage.

* * * * *